(No Model.)

S. IRWIN, Jr.
CULTIVATOR.

No. 356,586. Patented Jan. 25, 1887.

ATTEST-
J. Henry Kaiser
Thos. H. Scott

INVENTOR-
Samuel Irwin Jr.
by F. L. Browne
Attorney

UNITED STATES PATENT OFFICE.

SAMUEL IRWIN, JR., OF BEATRICE, NEBRASKA.

CULTIVATOR.

SPECIFICATION forming part of Letters Patent No. 356,586, dated January 25, 1887.

Application filed July 26, 1886. Serial No. 209,066. (No model.)

*To all whom it may concern:*

Be it known that I, SAMUEL IRWIN, Jr., a citizen of the United States, residing at Beatrice, in the county of Gage and State of Nebraska, have invented certain new and useful Improvements in Corn-Cultivators; and I do hereby declare the following to be a full, clear, and exact description of the invention, such as will enable others skilled in the art to which it appertains to make and use the same.

My invention relates to an improvement in cultivators for the cultivation of listed corn, and more particularly to that class known as "straddle-row" cultivators; and it consists of the improvements hereinafter described, and pointed out in the claims.

Figure 1:
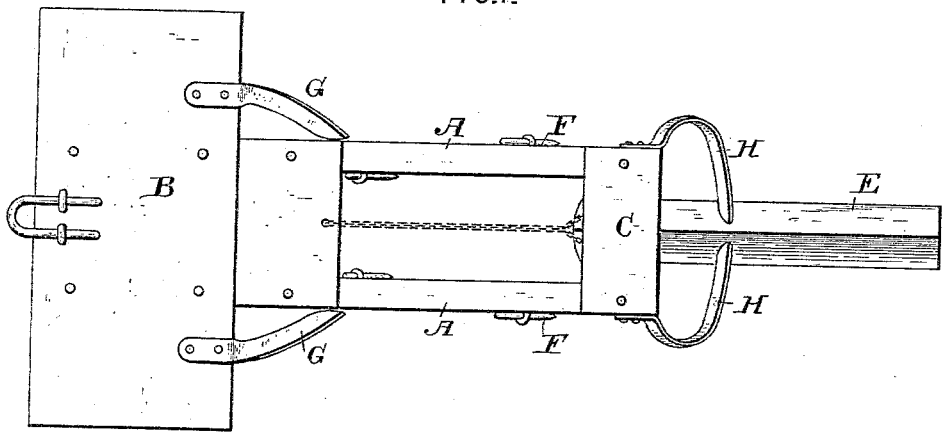
Figure 2:
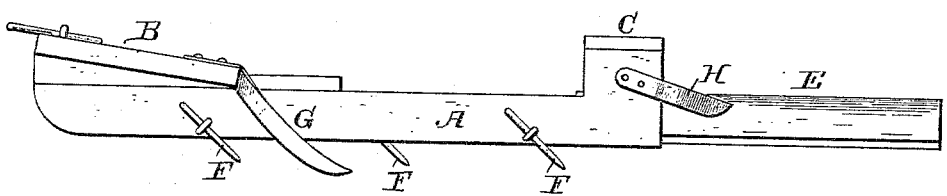
Figure 3:
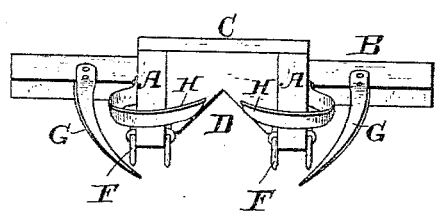

In the accompanying drawings, Figure 1 represents a top plan view of my improved cultivator. Fig. 2 is a side view thereof, and Fig. 3 a rear view.

A A represent two parallel runners, of wood, which are placed a sufficient distance apart to permit of their straddling a row of corn, one runner on each side of such row, and are connected at their front ends by the platform or cross-piece B, bolted or otherwise fastened thereto. This cross-piece or platform B may be used by the driver as a stand from which to drive the team. At their rear ends the runners are connected by a raised cross-piece, C, which is provided on its under side with a V-shaped notch, D, adapted to receive an inverted trough, E, which is fastened to the front platform, B, by a chain, and which follows in the rear of the cultivator and covers the row of corn and protects the same from injury. The notch D, which receives the inverted trough-shaped protector E, serves to hold said protector in longitudinal position.

The cultivator-teeth F are fastened to the runners A A in any suitable manner alternately on the inside and outside of the runners. These teeth may be few or many in number, as may be preferred. Upon the rear of the front platform, B, there are fastened two knives, G G, one on each side of said platform and outside of the runner A A. These knives are twisted so as to present their cutting-edge toward the line of draft, for the purpose of cutting off the grassy upper edges of the furrow turned up by the cultivator-teeth on the runners A A. Upon the rear platform, C, there are attached two knives, H H, one on each side thereof, which are bent or curved in such form that they will draw the soil which has been cut from the furrow by the forward knives, G G, close up to the corn and around its roots.

Upon the front of the forward platform there is provided a draft-staple, to which the team is attached.

I have described and shown the trough for protecting the roots of young plants as being connected to the front platform of the frame by a chain, and confined in position so as to slide over the plants in the line of the row by a V-shaped guide at the rear of the frame. This construction and manner of using a trough-slide for protecting the plants gives the advantage of allowing it to rise and fall freely to conform to the surface of the ground, and to move freely sidewise at either end to conform to the line of the row, and to slide freely over the plants so as to avoid the action of a rigidly-connected scraper or fender-board. The trough as I have adapted it is confined near its front end in an open guide-groove of the frame, and this, with the chain-connection, permits the trough to move as a slide, having no fixed connection while covering and protecting the plants. It is not controlled by the movements of the frame, except at its guide-retaining groove, to prevent its lateral displacement from the line of the plants. The guide-groove, moreover, serves to hold the trough in position between the rear curved blades, which scrape the loose earth to the trough, so as to form a ridge on each side of the row of plants.

Having thus described my invention, what I claim as new, and desire to secure by Letters Patent, is—

1. The combination, with the frame and the rear curved blades, of the covering-trough protector for the plants drawn as a loosely-attached slide and having a guide-retaining groove in the under side of the rear end of the frame, substantially as described.

2. The cultivator-frame provided with teeth and cutting and scraping blades, and having an inverted V-shaped groove at the under side of its rear end, in combination with the trough-slide protector having a chain-connection with said frame, substantially as described.

In testimony whereof I affix my signature in presence of two witnesses.

SAMUEL IRWIN, JR.

Witnesses:
ALBERT H. BABCOCK,
PHILIP E. WINTER.